July 21, 1953     HIROSHI ITO     2,645,975
HIGH APERTURE WIDE ANGLE FOUR COMPONENT GAUSS TYPE OBJECTIVE
Filed June 29, 1951
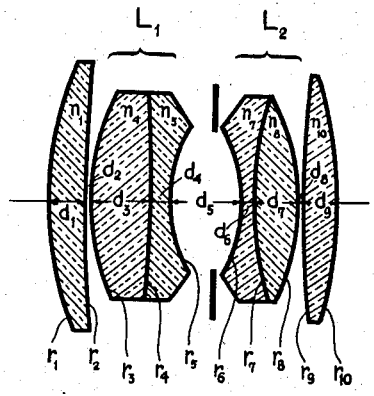
INVENTOR
HIROSHI ITO
BY
HIS ATTORNEY Patented July 21, 1953

2,645,975

UNITED STATES PATENT OFFICE 2,645,975

HIGH APERTURE WIDE ANGLE FOUR COMPONENT GAUSS TYPE OBJECTIVE

Hiroshi Ito, Setagaya-ku, Tokyo, Japan, assignor to Canon Camera Company, Ltd., Chuouku, Tokyo, Japan, a corporation of Japan Application June 29, 1951, Serial No. 234,356
In Japan July 14, 1950

5 Claims. (Cl. 88—57)

The present invention relates to an improved wide angle photographic objective of Gauss type composed of six glasses having an angular field in excess of 60 degrees and an extremely high aperture, suitable for miniature cameras.

The object of the present invention is to make a lens with high aperture and wide angular field and free from various aberrations without using any special kind of glass.

When the angular field of a lens reaches more than 60°, aberrations higher than the fifth order still remain after the so-called Seidel's five aberrations have been removed, and its theoretical formula becomes so complicated that it can never be solved. Accordingly the object of the lens of the present invention is to reduce the influences of the said aberrations higher than the fifth order. Therefore, the refractive power $\varphi_i$ of each individual surface of the designed lens system should be as small as possible, and when $\varphi_i$ is small, the chromatic aberration along the axis and lateral color difference of magnification, which is represented by $$\frac{\varphi_i}{\nu_i}$$

where $\nu_i$ is the Abbe number of the lens, naturally becomes smaller, which will do away with the need of any special kind of glass of a particular Abbe number to correct chromatic aberration. Again, when further contemplating the necessity of removing distortion, it is concluded that the most reasonable way to achieve the said object is to improve the prior known objectives of the Gauss type. Hitherto there has been no example in which an objective of the Gauss type was used as a wide angle lens with more than 60° angular field and aperture above F:3.5, but the present inventor, after studies on the basis of the above-mentioned reasoning, has succeeded in making an objective with such including field and aperture.

The present inventor has confirmed that the Petzval sum should be in the neighborhood of 0.35 when the focal length is unity, and that the means to realize such relation is to give a certain curvature and thickness to the positive lens of the cemented lens system on the object-side and to the negative lens of the cemented lens system on the picture-side respectively.

The instant invention will be best understood from the following detailed description of an illustrative embodiment thereof taken in conjunction with the appended drawing, of which the single figure shows an axial section of the lenses of the objective illustrative of my invention.

The objective consists of four axially aligned components of which the inner two are cemented doublets $L_1$ and $L_2$ of meniscus shape to either side of the stop S with their exterior concave surfaces facing each other. The front positive lens has an axial thickness $d_1$, a convex front surface of radius $r_1$, and a concave rear surface of curvature $r_2$. The convex front surface of doublet $L_1$ has a curvature of radius $r_3$ and is spaced in air the axial distance $d_2$ from the concave rear surface of the front positive lens. The cemented interface of doublet $L_1$ is concave to the object side of the objective and of a curvature of radius $r_4$, while its concave rear surface is of a curvature of radius $r_5$, the front lens component of the doublet having an axial thickness $d_3$ while that of the rear lens component is $d_4$. The concave front surface of rear doublet $L_2$ is air spaced the axial distance $d_5$ from the concave rear surface of doublet $L_1$ and has a curvature of radius $r_6$. The cemented interface of doublet $L_2$ is convex to the object side of the objective and has a curvature of radius $r_7$, while its convex rear surface is of radius $r_8$, and the axial thickness of front lens component is $d_6$ and that of its rear lens component is $d_7$. The convex rear surface of doublet $L_2$ is air spaced the distance $d_8$ from the convex front surface of the rear positive lens of axial thickness $d_9$ and of which the convex front surface has a curvature of radius $r_9$ and its convex rear surface one of $r_{10}$. The absolute value of $r_3$, the curvature of the convex front surface of the object-side doublet $L_1$, in accordance with the instant invention, is made of such magnitude as to be in the range of from 0.4 to 0.5 times the focal length of the objective, while $r_5$, the curvature of the concave rear surface of such doublet is given a magnitude within the range of from 0.25 to 0.35 times such focal length, and the total axial thickness of such doublet, namely $d_3$ plus $d_4$, is made larger than both the air gap $d_5$ between the facing concave surfaces of doublets $L_1$ and $L_2$ and the thickness axially of doublet $L_2$, that is $d_6$ plus $d_7$, with the total axial thickness of doublet $L_1$ between 0.14 and 0.18 times such total focal length of the objective.

The detailed constructional magnitudes for an illustrative embodiment of the instant invention are:

[$f=1.0$    1:3.0    Including Angle 64°]

| | | | |
|---|---|---|---|
| $r_1 = 0.6248$ | $d_1=0.0735$ | $n_2=1.5891$ | 61.2 |
| $r_2 = 2.0900$ | $d_2=0.0197$ | | |
| $r_3 = 0.4501$ | $d_3=0.1428$ | $n_4=1.6073$ | 59.5 |
| $r_4 = -2.3268$ | $d_4=0.0214$ | $n_5=1.5785$ | 41.7 |
| $r_5 = 0.2975$ | $d_5=0.1428$ | | |
| $r_6 = -0.2907$ | $d_6=0.0197$ | $n_7=1.5785$ | 41.7 |
| $r_7 = 0.9054$ | $d_7=0.1025$ | $n_8=1.6031$ | 60.7 |
| $r_8 = -0.3952$ | $d_8=0.0020$ | | |
| $r_9 = 3.0986$ | $d_9=0.0642$ | $n_{10}=1.6228$ | 56.9 |
| $r_{10}=-0.7947$ | | | |

In the present invention, throughout the lens system the material of glass for the lens may be common kinds, for example heavy crown glass for the convex lens components and light flint glass for the concave lens components. Further, not only may the angular field be more than 60° when the aperture is very high, but coma, which is very prone to remain in this style of lens, can be almost entirely removed throughout the picture, to say nothing of chromatic and other aberrations.

I claim:

1. High aperture wide angle aberration corrected objective of the Gauss type comprising two axially aligned and spaced compound meniscus lenses positioned between two simple convergent lenses, each compound meniscus lens having a divergent element cemented to a convergent element, wherein the front surface of the object-side compound meniscus lens has a convex curvature of a radius whose magnitude is between 0.4 to 0.5 times the total focal length of the objective, the rear surface of the object-side compound meniscus lens has a concave curvature of a radius whose magnitude is between 0.25 to 0.35 times the total focal length, and the axial thickness of the object-side compound meniscus lens exceeds both the axial spacing between the two compound meniscus lenses and the axial thickness of the image-side compound meniscus lens.

2. An aberration corrected objective of the Gauss type having an aperture in excess of F:3.5 and an angular field from 60 degrees upward comprising two axially spaced compound meniscus components positioned between two simple convergent lenses, each compound meniscus component having a divergent element cemented to a convergent element, wherein the front surface of the object-side compound meniscus component has a convex curvature of a radius whose magnitude is between 0.4 and 0.5 times the total focal length of the objective, the rear surface of the object-side compound meniscus component has a concave curvature of a radius whose magnitude is between 0.25 and 0.35 times the total focal length, and the axial thickness of the object-side compound meniscus component is from 0.14 to 0.18 times the total focal length and exceeds both the axial spacing between the two compound meniscus components and the axial thickness of the image-side compound meniscus component.

3. High aperture wide angle aberration corrected objective of the Gauss type comprising two axially aligned and spaced compound meniscus lenses positioned between two simple positive lenses, each compound meniscus lens having a divergent element cemented to a convergent element, wherein the front surface of the object-side compound meniscus lens has a convex curvature of a radius between 0.43 and 0.47 times the total focal length of the objective, the rear surface of the object-side compound meniscus lens has a concave curvature of a radius whose magnitude lies between 0.27 and 0.33 times the total focal length, and the axial thickness of the object-side compound meniscus lens is larger than the axial spacing between the two compound meniscus lenses and the axial thickness of the image-side compound meniscus lens.

4. An objective according to claim 3 in which the angular field is in excess of 60 degrees and the aperture is above F: 3.5 and the thickness of the object-side meniscus compound lens is between 0.14 and 0.18 times the total focal length of the objective.

5. An aberration corrected objective of the Gauss type of high aperture and wide angular field comprising two compound meniscus components axially spaced between two simple convergent lenses and having the following magnitudes, where $r_{\text{subscript}}$ is the radius of the lens surfaces from the front to the rear of the objective, $d_{\text{subscript}}$ the axial distances between successive lens surfaces in such direction, $n_{\text{subscript}}$ the index of refraction of the lens component, and the last column the Abbe number of the lens component:

[Focal Length=1.00    F:3.0    Including Angle 64°]

| | | | |
|---|---|---|---|
| $r_1 = 0.6248$ | $d_1=0.0735$ | $n_2=1.5891$ | 61.2 |
| $r_2 = 2.0900$ | $d_2=0.0197$ | | |
| $r_3 = 0.4501$ | $d_3=0.1428$ | $n_4=1.6073$ | 59.5 |
| $r_4 = -2.3268$ | $d_4=0.0214$ | $n_5=1.5785$ | 41.7 |
| $r_5 = 0.2975$ | $d_5=0.1428$ | | |
| $r_6 = -0.2907$ | $d_6=0.0197$ | $n_7=1.5785$ | 41.7 |
| $r_7 = 0.9054$ | $d_7=0.1025$ | $n_8=1.6031$ | 60.7 |
| $r_8 = -0.3952$ | $d_8=0.0020$ | | |
| $r_9 = 3.0986$ | $d_9=0.0642$ | $n_{10}=1.6228$ | 56.9 |
| $r_{10}=-0.7947$ | | | |

HIROSHI ITO.

References Cited in the file of this patent

UNITED STATES PATENTS

| Number | Name | Date |
|---|---|---|
| 583,336 | Rudolph | May 25, 1897 |
| 1,786,916 | Merte | Dec. 30, 1930 |
| 2,003,881 | Grosset et al. | June 4, 1935 |
| 2,031,792 | Richter | Feb. 25, 1936 |
| 2,117,252 | Lee | May 10, 1938 |
| 2,391,209 | Warmisham | Dec. 18, 1945 |